C. W. BAEDER.
TRIMMER FOR STEREOTYPES.
APPLICATION FILED NOV. 30, 1908.

941,549.

Patented Nov. 30, 1909.
2 SHEETS—SHEET 1.

Witnesses

Inventor
Chas W. Baeder.
By
Attorney

C. W. BAEDER.
TRIMMER FOR STEREOTYPES.
APPLICATION FILED NOV. 30, 1908.
941,549.
Patented Nov. 30, 1909.
2 SHEETS—SHEET 2.
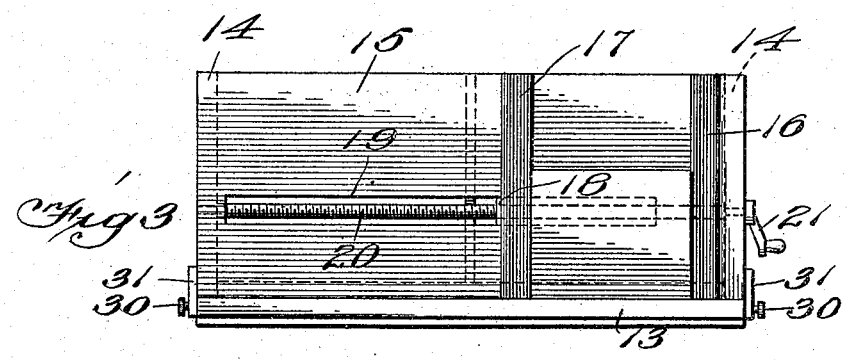
Fig. 3
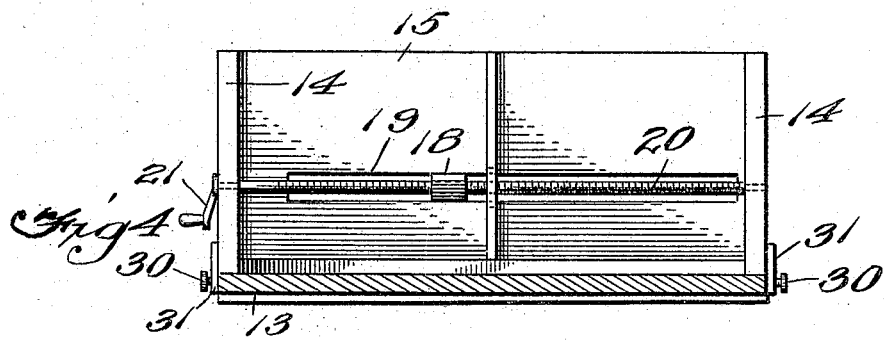
Fig. 4
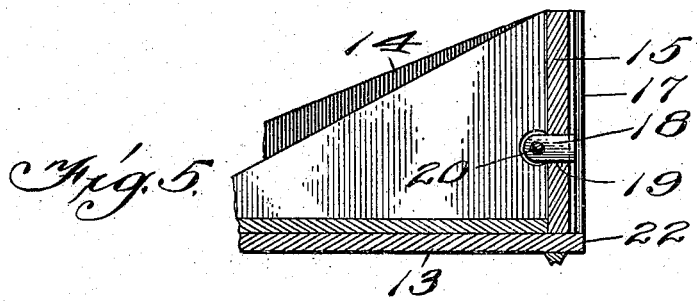
Fig. 5
Witnesses
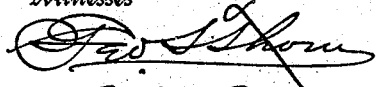
Inventor
Chas. W. Baeder.
By
Attorney

UNITED STATES PATENT OFFICE.

CHARLES W. BAEDER, OF MEMPHIS, TENNESSEE.

TRIMMER FOR STEREOTYPES.

941,549.  Specification of Letters Patent.  Patented Nov. 30, 1909.

Application filed November 30, 1908. Serial No. 465,202.

*To all whom it may concern:*

Be it known that I, CHARLES W. BAEDER, citizen of the United States, residing at Memphis, in the county of Shelby and State of Tennessee, have invented certain new and useful Improvements in Trimmers for Stereotypes, of which the following is a specification.

This invention is a machine for planing or trimming stereotype cuts down to type high, and acts to trim or cut down the base thereof, and may be used for cutting down bases or blocks on which to mount zinc or electro-type cuts in order to bring the same to proper height for use in printing or stereotyping.

The object of the invention is to provide a device which will do this work quickly and accurately.

It comprises in its construction the combination with a trimmer or planer head, of a work holder or carriage which holds the cut or block in edgewise position and is movable to present the back of the same to the trimmer head, the work holder being provided with a clamp for holding the cut in position.

The invention is illustrated in the accompanying drawings in which—

Figure 1:
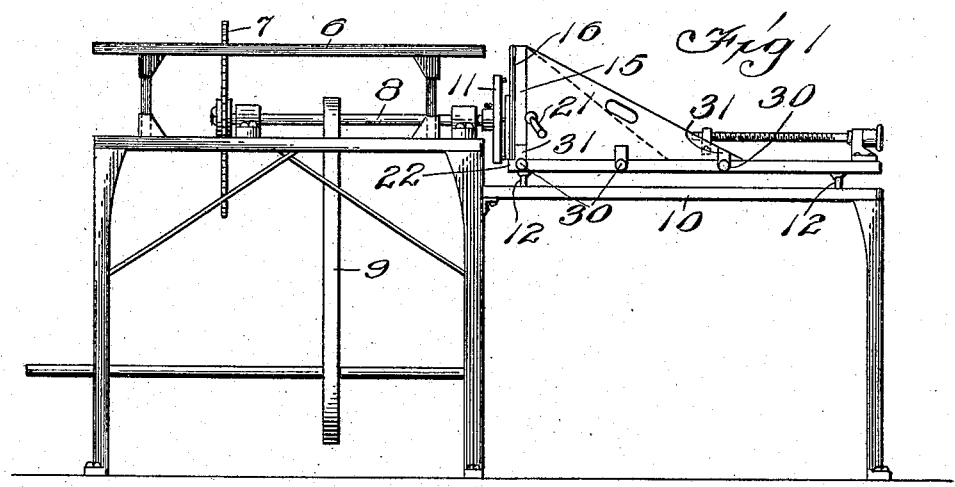
Figure 2:
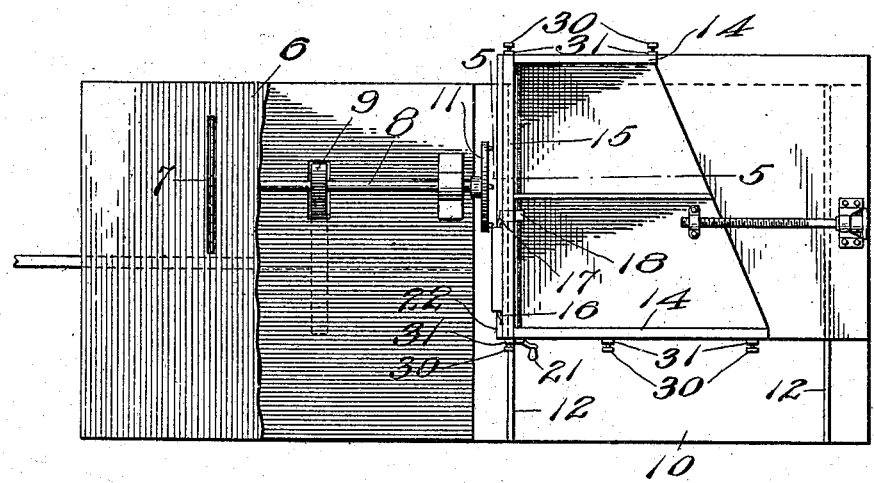

Figure 1 is a side elevation of the machine; Fig. 2 is a top plan view; Fig. 3 is a face view of the work holder, showing the clamp; Fig. 4 is a rear view of the work holder; Fig. 5 is a section on the line 5—5 of Fig. 2.

The device may be used or mounted in connection with a saw for trimming the edges of stereotypes or other cuts, and it is so shown in the drawings, the saw table or bench being indicated at 6, with a saw 7 mounted upon one end of an arbor 8 driven by any suitable means, as by a belt 9 and pulley. Beside the saw table is a bench 10 for supporting the work holder or carriage of the trimmer. The trimmer head or planer 11 is mounted upon the end of the arbor 8, opposite to the saw 7, and overhangs or projects above the trimmer bench. The top of this bench is provided with laterally extending guides or tracks 12 on which the work holder is slidable laterally with respect to the trimmer head.

The work holder or carriage has a base board or bed 13 upon which is mounted a frame consisting of side pieces 14 joined to a vertical face plate 15. This frame rests upon the bed 13 and is held in adjusted position thereon by means of set screws 30 which extend through lugs 31 depending from the end pieces 14 beside the edges of the bed, against which edges the screws are tightened. The front piece 15 has at one end or side a fixed clamp member 16 and opposite the same has a movable clamp member 17 having a lug or projection 18 on the back thereof extending through a horizontal slot 19 made in the face piece. This lug has a threaded hole to receive a non-traveling screw 20 which is mounted in bearings in the side pieces 14 and is provided at one end with a crank 21 whereby it may be turned to advance or retract the movable clamp member 18 which slides in contact with the surface of the face plate 15. The plate 15 is set back slightly from the front edge of the base board 13 to form a shoulder 22.

The cut or block to be trimmed is indicated at 23, standing on its edge on the shoulder 22, with its face against the plate 15 and its back presented toward the trimmer head 11, which may be of any suitable kind, provided with knives or blades to plane or trim off the back of the block. The movable clamp member 17 may by means of the screw be adjusted to hold plates of different sizes.

In the use of the device, the stereotype or other cut or block is set in the holder and held by the clamp in the manner indicated and the holder is advanced or moved laterally across the trimmer head on the guides 12, conveniently by taking hold of the side pieces 14, which are provided with hand holes for the purpose. This brings the cut against the trimmer head which planes or cuts down the back thereof to make the cut the proper height for the intended purpose. The trimmer head will be large enough to cover the full height of the cut to be trimmed. With extra high cuts, one end can be trimmed, and then turned around to trim the other end. The cut being held in exact relation to the trimmer head gives very accurate work, the guides on which the holder moves being exactly at a right angle to the axis of the arbor so that variation in thickness is impossible. A single pass will ordinarily trim the whole surface of the cut, enabling the work to be very quickly done, which is an important consideration, especially in newspaper offices, where the device is particularly intended for use.

I claim:

The combination with a rotary trimmer head, of a work holder movable transversely across the same and having a face plate standing edgewise perpendicular to the axis of the head and provided with a longitudinal slot, and a clamp comprising two members supported on the face plate, for holding the work thereon, one member being movable and having a lug projecting into the slot, and a screw engaging the lug for operating said movable member.

In testimony whereof, I affix my signature in presence of two witnesses.

CHARLES W. BAEDER.

Witnesses:
 JAS. SEAT,
 C. W. DAVIS.